US009089005B2

(12) United States Patent
Boedicker et al.

(10) Patent No.: US 9,089,005 B2
(45) Date of Patent: Jul. 21, 2015

(54) COOKING OVEN CONTROL SYSTEM

(75) Inventors: Stephen Boedicker, Louisville, KY (US); James Bach, Seymour, IN (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 13/401,388

(22) Filed: Feb. 21, 2012

(65) Prior Publication Data

US 2013/0213951 A1 Aug. 22, 2013

(51) Int. Cl.
*A21B 1/00* (2006.01)
*H05B 1/02* (2006.01)

(52) U.S. Cl.
CPC .................................... *H05B 1/0263* (2013.01)

(58) Field of Classification Search
USPC .......................................................... 219/413
See application file for complete search history.

(56) References Cited

U.S. PATENT DOCUMENTS 4,427,867 A * 1/1984 Dills ............................ 219/746
4,692,598 A * 9/1987 Yoshida et al. ............... 219/497
4,720,623 A 1/1988 DiCesare et al.
5,040,724 A * 8/1991 Brinkruff et al. ........... 236/15 A
5,235,159 A * 8/1993 Kornrumpf et al. .......... 219/486
5,656,189 A * 8/1997 Crockett et al. .............. 219/499
5,793,022 A * 8/1998 Klinck et al. ................ 219/483
6,114,663 A * 9/2000 Stockley ....................... 219/398
6,355,914 B1 * 3/2002 Stockley ....................... 219/482
7,041,940 B2 * 5/2006 Bakanowski et al. ......... 219/412
7,189,947 B2 3/2007 Fulton
7,750,271 B2 * 7/2010 Smith et al. ................... 219/413
8,645,000 B2 * 2/2014 Park ............................. 700/299
2003/0116557 A1 * 6/2003 Graff ............................ 219/492
2009/0107978 A1 * 4/2009 Sugishita et al. ............. 219/385

FOREIGN PATENT DOCUMENTS

CN 101561219 A 10/2009

* cited by examiner

*Primary Examiner* — Dana Ross
*Assistant Examiner* — Renee L Miller
(74) *Attorney, Agent, or Firm* — Dority & Manning, P.A.

(57) ABSTRACT

A control system for an oven including a plurality of heating elements positioned within the cooking cavity includes a temperature sensor configured to detect an air temperature within the cooking cavity, a user interface for receiving a desired temperature set point command, and a controller operatively coupled to the temperature sensor and user interface. The controller is configured to determine a power splitting ratio between the first and second heating elements based on user-specified cooking mode and/or type of food being cooked, determine a total power command signal based on a determined error value between the detected cavity air temperature and the desired temperature set point command, and adjust a power level of each of the first and second heating elements based on the total power command and the power splitting ratio.

17 Claims, 3 Drawing Sheets

COOKING OVEN CONTROL SYSTEM

BACKGROUND

The present disclosure generally relates to appliances, and more particularly to a control system for a cooking oven.

In an oven, such as an oven for residential use, the air and surfaces in the cooking chamber (often referred to as the oven cavity) are heated by one or more heat sources, typically two, one on at the top of the oven cavity and the other at the bottom. The food in the oven cavity is cooked by a combination of the heated air (natural convection) and infrared (IR) radiation from the heat sources and the cavity's interior surfaces. The evenness of cooking is a desirable feature for a cooking oven. Some ovens monitor the temperature of the air inside the oven cavity and cycle the heat source on and off to attempt to regulate the temperature of the air. When the heat source is turned on, a considerable amount of energy is used to heat the oven cavity in a relatively short time. This can cause imprecise oven temperature control in the form of temperature overshoot, for example. The temperature overshoot can easily result in temperature variations of approximately 20 degrees Fahrenheit, for example, which can lead to uneven cooking. Also, when the heat source is turned on, a considerable amount of direct infrared (IR) radiation radiates from the heat source and impinges on the surfaces of the food being cooked. For even cooking, without over-browning of the food surfaces, it is often more desirable to have a lower, steady amount of radiation rather than larger, pulsing (bursts of) radiation.

A typical oven will include one or more heating elements, such as a broil heating element at the top of oven and a bake heating element at the bottom of the oven. These heating elements are controlled to regulate the temperature of the oven cavity based on feedback from a temperature sensor located within the oven cavity. However, the combined power requirements of both heating elements, which can easily exceed approximately 30-amperes, can exceed the power delivery capacity of the residential power supply, which is typically around 20-amperes. To prevent the oven from drawing more power than can be supplied, in the typical relay-controlled oven, when cycling the heating elements at a very slow rate, such as in a "bang-bang" or hysteresis type control system or a PI/PID control system, the control system algorithm must prevent both heating elements from being operated at the same time. However, in certain cooking modes, it could be advantageous to provide heat from both the broil and bake heating elements at the same time. While certain oven control systems may control both of the heating elements, these systems typically rely on a varying power ratio between the elements in order to maintain the oven cavity temperature nearly constant. However, a varying power ratio can have an adverse effect on cooking performance.

Accordingly, it would be desirable to provide a control system for an oven that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a power control system for an oven that includes a body defining a cooking cavity and a plurality of heating elements positioned within the cavity. In one embodiment the control system includes a temperature sensor configured to detect a temperature of air within the cooking cavity; a user interface for receiving a desired temperature set point command; and a controller operatively coupled to the temperature sensor and user interface. The controller is configured to determine a power splitting ratio between the heating elements; determine a power command signal based on a determined error value between the detected cavity air temperature and the desired temperature set point command; calculate a power control command signal for each of the heating elements; and adjust a power level of each of the heating elements based on the respective power control command signals.

Another aspect of the disclosed embodiments is directed to a method of controlling heating elements in an oven cavity of an oven. In one embodiment, the method includes detecting a desired temperature set point for the oven cavity air; detecting a temperature of the oven cavity air; determining an error between the desired temperature set point and the temperature of the oven cavity air; detecting a cooking mode of the oven; determining a power splitting control ratio between the heating elements, the power splitting control ratio corresponding to the cooking mode; and controlling a power level of each heating element based on the determined error and the power splitting control ratio.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
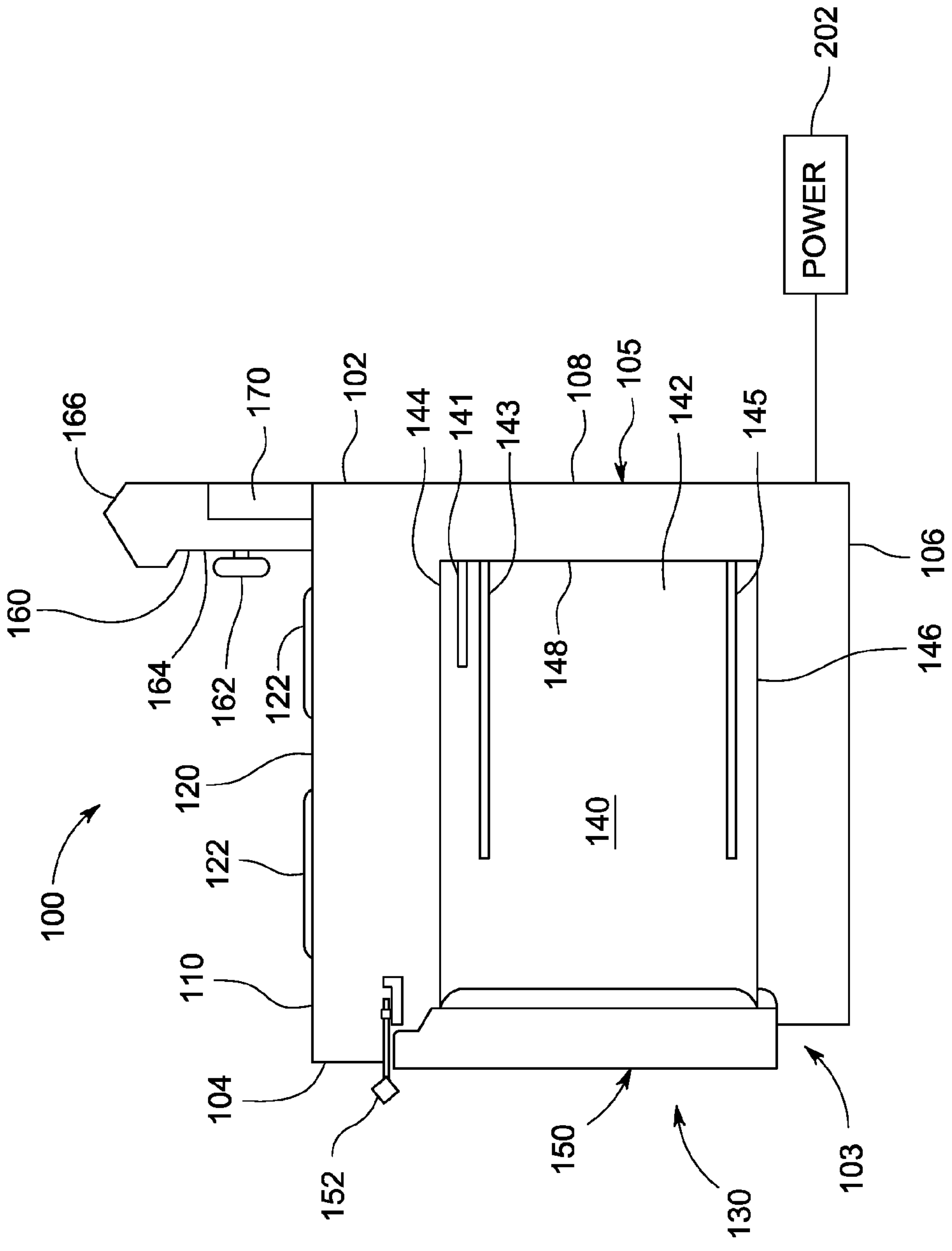
FIG. 1 is a cut-away side view of an exemplary range incorporating aspects of the disclosed embodiments.

Referring to FIG. 1, an exemplary appliance such as a free standing range in accordance with the aspects of the disclosed embodiments is generally designated by reference numeral 100. The aspects of the disclosed embodiments are directed to a control system for an oven that improves the ability of an oven to maintain a given set point temperature by using a proportional, proportional integral or proportional integral derivative controller (each or all generally referred to herein as a "P/PI/PID controller") that delivers substantially steady power to the heating elements and proportions the power between the heating elements in a constant ratio. This more precise heating element control enables the ability to maintain a given temperature within the oven cavity, as well as allow each of the heating elements in the oven to be powered simultaneously without exceeding the capacity of the power delivery system (wiring) within the home.

Although the aspects of the disclosed embodiments are generally described herein with respect to a cooking appliance, in alternate embodiments any device having a heating chamber and two or more heat sources can be contemplated. Furthermore, although the aspects of the disclosed embodiments will be generally described herein with respect to an oven that includes a bake heating element and a broil heating element, the aspects of the disclosed embodiments are not so limited. In alternate embodiments, the oven could be or include a convection style oven, which typically includes a third heating element as well as a fan, as well as a multi-zone broil element, where the oven includes multiple ceiling-mounted heating elements, such as for example 2, 3 or 4 heating elements, that are activated, either individually or in unison, when the broil mode of the oven is selected.

As is shown in FIG. 1, the range 100 is generally in the form of a free-standing range, although other oven type products are contemplated as well, such as wall-mounted ovens. The range 100 includes a cabinet or housing 102 that has a front portion 104, a bottom portion 106, a back portion 108, a top portion 110, and opposing side portions 103, 105, only one of which is shown.

In the embodiment shown in FIG. 1, a cooking surface 120 on the top portion 110 of the range 100 includes heating elements 122. Positioned within the housing 102 of the range 100 is a cooking chamber or cavity 140 formed by a box-like oven liner having vertical side walls 142, a top wall 144, bottom wall 146, rear wall 148 and a front opening door 150.

In the example shown in FIG. 1, the oven cavity 140 is provided with two heat sources or heating elements 143, 145, although as noted above, the aspects of the disclosed embodiments can include an oven cavity 140 with more than two heating sources or elements. In this example, a bake heating element 143 is positioned adjacent the bottom wall 146 and a broil heating element 145 is positioned adjacent the top wall 144. In the embodiment shown in FIG. 1, the heating elements 143, 145 are electrically powered heating elements and could include either the traditional sheathed resistance heating element or a quartz-enclosed element. In alternate embodiments, the heating elements 143, 145 could comprise gas powered heating elements. When a gas powered heating element is utilized, an electrically-controlled gas valve (not shown) to control the gas flow rate could be implemented or utilized. The gas-flow control valve or solenoid will provide a substantially continuous range of gas-flow rates controlled by an electrical signal supplied by the oven controller 170, as will be further described herein.

A temperature probe or sensor 141 is disposed within the oven cavity 140. In the example shown in FIG. 1, the sensor 141 is configured to project into the cavity 140 between the broil heating element 143 and the top wall 144. However, in alternate embodiments, the temperature sensor 141 can be disposed at any suitable location within the oven cavity 140, such as for example, on the top wall 144 or either of the side walls 142. In one embodiment, the oven 130 can include more than one sensor 141, disposed along any suitable locations of the oven cavity 140. In yet another alternative embodiment, the temperature sensor 141 could be attached to a surface of one or more of the walls 142-148, either on a surface within the oven cavity 140 or a wall surface on the insulation side (not shown) of the cavity 140. In this embodiment, the sensor 141 measures the temperature of the cavity wall surface, which is then used as a measure of oven air temperature.

The door 150 of the oven 130 can generally be pivoted between an open and closed position in a manner generally known. A door latch 152 can be used for locking door 150 in a closed position.

The cabinet 102 also includes a control panel or user interface 160 that supports control knobs, such as knob 162, or other suitable controls (e.g. touch-pad), for regulating the heating elements 122. The control panel 160 can also include a central control and display unit 164. The control panel 160 is generally configured to allow the user to set and adjust certain functions of the oven 100, including, but not limited to a cooking mode and a cooking temperature. The control panel 160 and control knob 162 can be supported by a hack splash 166 of the oven 100.

In one embodiment, the range 100 includes an oven controller 170. The oven controller 170 is generally configured to control the operation of the range 100 and oven 130. The oven controller 170 is operatively coupled to the sensor 141 for receiving signals representative of the detected temperature of the oven cavity 140 from sensor 141. The oven controller 170 is also operatively coupled to the heating elements 143, 145 and power source 202 for selectively controlling the operation of each of the heating elements 143, 145. The control panel 160 and the control knob 164 can be used to provide inputs, commands and instructions to the oven controller 170, such as for example, the selection of a desired oven cavity temperature set point. The controller 170 generally includes one or more processors that are operable to process inputs, commands and instructions to control the operation of the heating elements 143, 145, as is further described herein. In one embodiment, the controller 170 includes a processing device and machine-readable instructions that are executed by the processing device. The controller 170 can also include or be coupled to a memory device(s). In one embodiment, such memory devices can include, but are not limited to read-only memory devices, FLASH memory devices or other suitable non-transitory memory devices.

Figure 2:
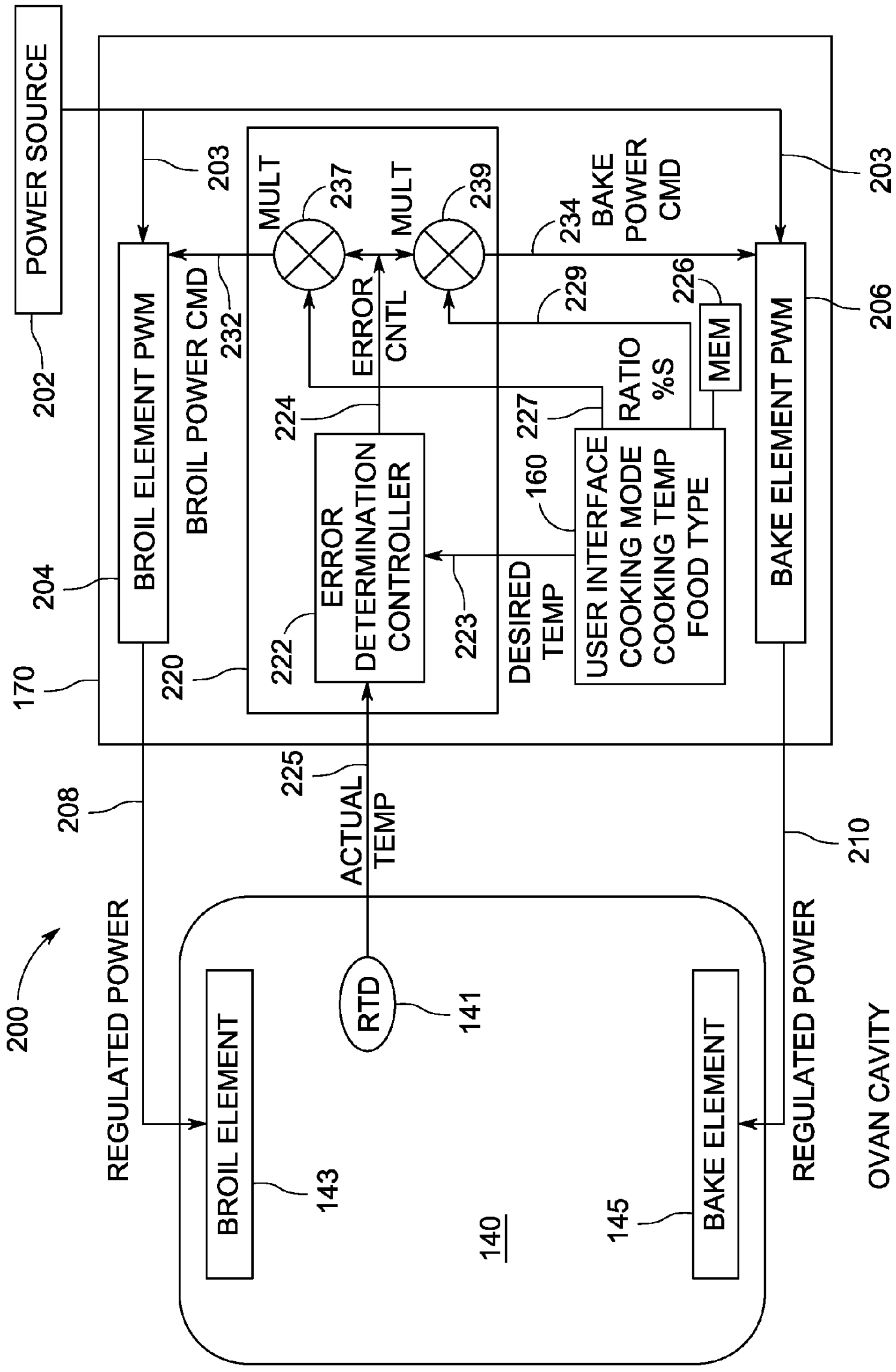
FIG. 2 is a block diagram of a control system incorporating aspects of the disclosed embodiments.

Referring to FIG. 2, a schematic block diagram of one embodiment of an oven temperature control system 200 incorporating aspects of the present disclosure is illustrated. As is shown in FIG. 2, the controller includes the oven controller 170, which is operatively coupled to each of the heating elements 143, 145. In one embodiment, the oven controller 170 is coupled to each heating element 143, 145 through a respective power regulating device 204, 206, respectively. Each power regulating device 204, 206, also referred to as a Broil Element PWM and Bake Element PWM, respectively, provide regulated power 208, 210 from the power source 202 to each of the heating elements 143, 145, respectively. In one embodiment, the power regulating devices 204, 206 comprise TRIAC type or relay type devices that are configured to block/pass the power signal from the power supply 202 to their respective heating elements 143, 145. In alternate embodiments, the power regulating devices 204, 206 can include any suitable power regulating device, such as for example, a solid state electronic device, a diode for alternating current device (DIAC), silicon controlled rectifier device (SCR) or insulated gate bipolar transistor (IGBT) type device.

In accordance with the aspects of the disclosed embodiments, the power regulating devices 204, 206 duty cycle control the supply of power to their respective heating elements 143, 145 from the power source 202, to provide a percentage or fraction of the full power available from the power source 202, also referred to as the AC supply or mains. The term "duty cycle control" refers generally to cycling the power signal 203 from the power source 202 0N/OFF at some rate (frequency=1/period). The duty cycle control generally determines the percentage or fraction of power from the power source 202 that is supplied to each element 143, 145. This can be achieved for example by "chopping" (phase controlling) the power signal, or pulse width modulating the signal (PWM) or cycle skipping.

The oven controller 170 includes a control module 220. In one embodiment, the control module 220 includes an error determination control module or controller 222. The error determination control module 222 is operatively coupled to the temperature sensor 141 and the user interface or control panel 160 and is configured to receive a desired temperature signal 223 representative of the desired cooking temperature, also referred to herein as the temperature set point, as well as an actual temperature signal 225 representative of the temperature of or within oven cavity 140. In one embodiment, the temperature set point 223 is set using the control knob 162 on the control panel 160. The temperature sensor 141, which in this example comprises a resistance temperature detector (RID) sensor, provides the actual temperature signal 225. In alternate embodiments the temperature sensor 141 can include any suitable temperature sensor, other than including an RTD type sensor, such as for example a thermistor, thermocouple, or integrated circuit. The error determination control module 222 is generally configured to calculate the difference or error between the desired temperature signal 223 and the actual temperature 225 and generate an error control signal 224. In one embodiment, the error determination control module 222 is proportional integral (PI) type control, configured to generate the error control signal 224 based on a sum of the error (difference between desired and sensed temperature) and the integral of the error, each multiplied by their respective control coefficients. This configuration provides a good balance between accuracy and processor capacity requirements. Alternatively, for tighter control of the temperature, control module 222 could be configured as a proportional integral differential (PID) control by also including in the sum, the derivative of the error multiplied by its control coefficient. In an alternative embodiment requiring the least computing resources, control module 222 could be configured as a proportional (P) control configured to generate an error signal based on the difference between the sensed temperature and the desired temperature. In each of these embodiments, the control coefficients are empirically determined to provide the desired performance for the oven to be controlled, as each oven design or operating environment will have its own particular thermal characteristics. The error control signal 224 of the error determination control module 222 is used by each power regulating device 204, 206, to regulate the duty cycle of the power signal 203 from the power source 202 to the heating elements 143, 145. In alternate embodiments, the error control signal 224 can be calculated or determined using any suitable logic control system, including, but not limited to P, PI, PID or fuzzy logic control based systems.

The aspects of the disclosed embodiments allow for simultaneous control of multiple heating elements, such as heating elements 143, 145 from a single controller 170. In one embodiment, the controller 170 proportions the power signal 203 from the power source 202 between the elements 143, 145 according to a constant power splitting ratio, generally referred to herein as the “top/bottom” ratio. The power splitting ratio generally maintains the proper top and bottom heat ratio regardless of the output or error control signal 224 of the controller 222. The power splitting ratio defines the split of power to the top element 143, represented by signal 227 and the bottom element 145, represented by signal 229. This generally allows the food in the oven to cook more evenly. The top/bottom power ratio 227/229 can depend upon factors such as the cooking mode, the cooking temperature and optionally, the type of food being cooked.

The control system 200 shown in FIG. 2 allows the user to control the cooking behavior of the oven 130 shown in FIG. 1 by setting and activating the cooking mode and cooking temperature using the control panel 160. In one embodiment, a food type can also be designated through the control panel 160. In alternate embodiments, the control panel or user interface 160 can also be used to control other functions and operational aspects of the range 100.

The cooking modes of the oven 130 can generally include a bake mode, a broil mode, a convection bake mode, a multi-bake mode and a warming mode. In one embodiment, the baking mode can include 1-rack, multi-rack and convection style baking. The cooking temperature is generally set by the user according to the desired temperature at which the food is to be cooked. In certain systems, the type of food being cooked can be identified and selected via the control panel 160. The types of food that can be designated can include for example, baked goods, meats, pizzas and frozen food items. In alternate embodiments, any food that is suitable for heating or cooking in an oven can be contemplated. In one embodiment, the oven controller 170 can include a pre-determined or stored cooking algorithm for specific types of foods, such as for example, meats, breads and baked goods.

The cooking mode, cooking temperature and food type can then be processed by the oven controller 170, to determine, for example, an actual required cooking temperature and the top/bottom power ratio 227/229. In one embodiment, the controller 170 is configured to determine an actual temperature needed in the oven cavity 140 for the proper cooking of the designated food item. The controller 170 is also configured to determine the relative splitting of the power to the heating elements 143, 145.

In one embodiment, the top/bottom power ratio 227/229 is a pre-determined value stored in a memory 226, or other suitable data storage element, such as a data table or database and is based on one or more the cooking mode, cooking temperature and food type referred to above. Studies have determined that certain foods require heating from one or both of the heating elements for optimum cooking results. The aspects of the disclosed embodiments establish a top/bottom cooking or power ratio 227/229 that effectively divides the power signal 203 provided by the power source 202 between the top or broil element 143 and the bottom or bake element 145. For example, an optimal or desired top/bottom heating or power ratio 227/229 for a cake positioned in the center of the oven cavity 140 is approximately 20/80, meaning that 20 percent of the total heating during cooking is coming from the broil (top) element 143 while 80 percent of the total heating during cooking is coming from the bake (bottom) element 145. A typical bake mode will have approximately 80 percent of the heat input from the bake element 145 and approximately 20 percent from the broil element 143. However, the heat input in this situation is not consistent because of hysteretic control behavior. The proportional control aspects of the disclosed embodiments advantageously allow for enhanced control of the heat delivery. As another example, for cooking or heating pizza, an optimal or desired top/bottom power ratio 227/229 is approximately 40/60. The top/bottom power ratio 227/229 dictates a ratio of power that can vary from cooking mode to cooking mode and food to food, or any combination thereof. Similarly, when baking using multiple racks (for example when baking cookies), the top/bottom power ratio 227/229 can be adjusted so as to not overly-cook the food items, or, for example, the bottoms of the food items on the bottom rack. Similarly, the top/bottom power ratio 227/229 can be altered if a “forced convection” heating system is employed, wherein heated air is circulated within the cavity 140 by a blower and heating element combination that is mounted in the back wall 148 of the oven cavity 140.

In the example of FIG. 2, the control module 220 includes multiplier devices 237 and 239, referred to as a broil multiplier device 237 and a bake multiplier device 239, operatively associated with the broil power element 204 and the bake power element 206, respectively. Although two multiplier devices are shown in FIG. 2, in alternate embodiments, a single integrated multiplier device can be used. Each multiplier device 237, 239 is generally configured to multiply the error control signal 224 by a respective one of the top/bottom power ratio signals 227, 229. The multiplication results in a broil power command 232 and a bake power command 234, each of which respectively defines how the power signal 203 is to be controlled and the heating elements 143, 145 adjusted. The multiplier devices 237, 239 generally include one or more processors that are configured to multiply the error control signal 224 by the respective power splitting ratio values 227/229. In one embodiment, the multipliers 237, 239 are comprised of machine-readable instructions that are executable by a processing device. The multiplication of the error control signal 224 by each of the top/bottom power ratio control signals 227, 229 proportions the power signal 203 from the power source 202 between the top and bottom heating elements 143, 145.

In the example shown in FIG. 2, the control system 200 allows each of the element power control devices 204, 206 to supply their respective heating elements 143, 145 with AC power at some fraction of the full power available from the power source 202. In one embodiment, the power signal 203 is duty cycle controlled (turned ON/OFF) at a rate that is defined by each of the broil power command 232 and bake power command 234. The ratio of the ON time of each of the power command signals 232, 234 to the period of each power command signal 232, 234 determines the duty cycle, that is, the percentage or fraction of power from the power source 202 that is supplied to each of the respective heating elements 143, 145.

If the ON time is nearly the entire period of the power command signal 232, 234, the respective heating element 143, 145 will produce nearly 100% of its possible power. If the ON time is relatively short, the heating element will receive very little of the possible power from the power source 202.

The period of each of the power command signals 232, 234 can be very fast, on the order of $1/120^{th}$ of a second (i.e. ½ of the wave cycle of a typical 60-Hz supply in the US). The period can also be very slow, on the order of 10 to 360 seconds (i.e. the slow cycling of a relay).

The power regulating devices 204, 206 control the time that each element is powered ON to the time that each element is powered OFF, in dependence upon the respective power command signal 232, 234. In one embodiment, the power regulating devices 204, 206 comprise relay devices, where each relay is cycled ON/OFF at a slow rate, such as 10 seconds ON/3 minutes OFF per cycle, and more typically 30 seconds ON/120 seconds OFF. Where the power regulating devices 204, 206 are relay type devices, the period of time each element 143, 145 is ON or OFF is longer due to the slowness or delay in opening and closing the relays, and because the life of the contacts is reduced with each open and close event. Thus, the relays will typically be cycled ON/OFF from anywhere between approximately 3 and 360 seconds. Good performance has been realized in the 30 second to and including 180 second range due primarily to the large thermal time-constant of the heating elements 143, 145, which take many seconds to heat up and cool down. In the case of relay controlled heating elements, if the combined current draw of the heating elements is sufficiently large, then the software controlling the relays needs to guarantee that both relays are not activated simultaneously, which could allow the oven appliance to draw too much current from the household power distribution system (wiring) 202. In this scenario, the sum of the two duty cycles must be less than 100% so that their activated (on) states do not overlap.

Where the power regulating devices 204, 206 comprise TRIAC type devices, either phase-angle fired or cycle skipping control modes of such suitable devices can be used. In phase-angle fired mode, each heating element 143, 145 is turned ON during a percentage of each half-cycle of the power supply signal 203 to achieve an average power. The circuit observes when the power supply signal 203 crosses through the zero volt point, waits a delay time and then turns on the power regulating devices 204, 206 for the remainder of the ½ cycle. The percentage of the ½ cycle that the power regulating devices 204, 206 are "ON" is controlled by the power command signals 232, 234. In a cycle-skipping mode, each heating element 143, 145 is turned on for a certain percentage of ½-cycles of the power supply signal 203. The aspects of the disclosed embodiments allow each of the heating elements 143, 145 to be powered on substantially simultaneously, although at a power level that is substantially less than 100%. The oven controller 170 can command between 0% and 100% power to either or both of the heating elements 143, 145 at substantially the same time. However, the sum of their duty cycles needs to remain below a predetermined value so as to not overload or draw too much current from the home's power distribution system (wiring) 202. In one embodiment, utilizing the power splitting ratio 227/229, the oven controller 170 can calculate the total power that will be consumed by powering both heating elements 143, 145 to the calculated levels in the current or selected operational mode. If that calculated total power level exceeds a pre-determined value, which can be the typical power rating for the range 100, the oven controller 170 can throttle back one or both of the heating elements 143, 145 by applying an adjustment factor or adjusting the power splitting ratio in a manner that will prevent an over current condition. For example, most residential power supply systems can provide 20, 30, or 40 amperes of current, depending on the size of wire used between the circuit breaker panel and the appliance. A 20 ampere limit will generally imply a total power limit of 20 amperes*240 volts=4800 watts. If the oven 130 is equipped with a 3600 watt bottom element 145 and a 2400 watt top element 143, and if both elements were powered on at 100% simultaneously, the oven 130 would attempt to produce 6000 watts. This would result in a draw of approximately 25 amperes from the 20 ampere residential supply and trigger the circuit breaker/fuse. However, since in accordance with aspects of the disclosed embodiments the power can be proportioned via the power splitting ratio 227/229, using the exemplary 20/80 ratio for cakes, the oven 130 will only draw (20%*2400 W)+(80%*3600 W)=3360 W or 14 A, which is below the limit of the exemplary residential supply. The controller 170 is configured to adjust the power splitting ratio to ensure that the total power consumption remains below the power capacity of the home's power distribution system 202.

Figure 3:
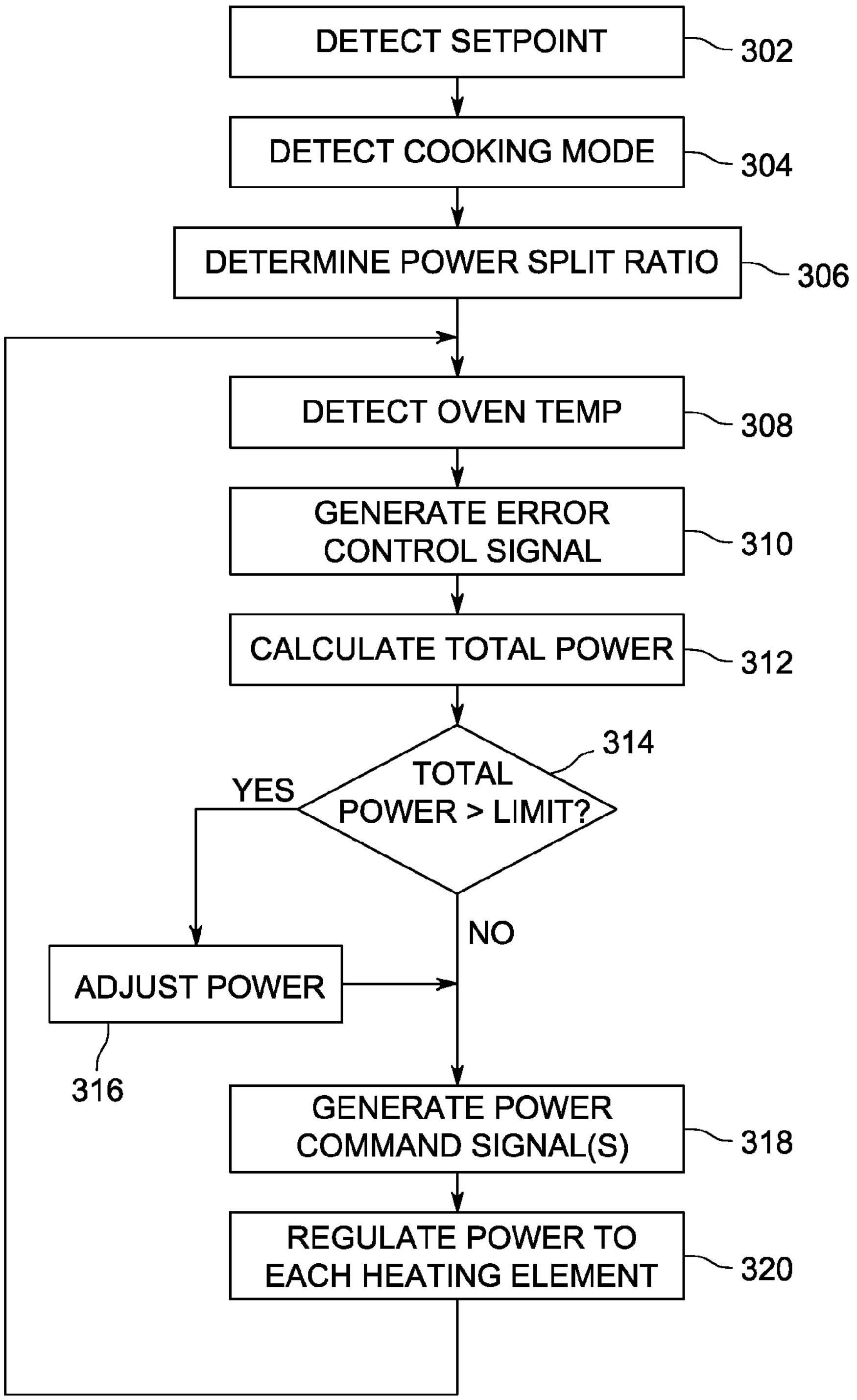
FIG. 3 is flow chart illustrating one method for controlling an oven according to an embodiment of the present disclosure.

FIG. 3 illustrates one embodiment of a process incorporating aspects of the disclosed embodiments. A temperature set point for cooking is detected 302. In one embodiment, this includes detecting a temperature setting input, such as desired temperature signal 233 shown in FIG. 2. The cooking mode is detected 304, which can include the cooking temperature and food type as described herein. The power splitting ratio, such as the power splitting ratio 227/229 shown in FIG. 2 is determined 306 based on one or more of the cooking mode, cooking temperature and food type. The oven cavity temperature is detected 308 and the error control signal 224 of FIG. 2 is determined 310.

In one embodiment, the combined total power consumption of each of the heating elements 143, 145 in this operating mode based on the error control signal is determined 312. If it is determined 314 that the total power consumption exceeds a pre-determined value, such as the residential supply limit, the power is adjusted 316 by applying a factor so that the total power delivered by both of the heating elements 143, 145, in the same proportion, does not exceed the pre-determined value. In one embodiment, this adjustment in the power is an adjustment (hard-limiting) of the error control signal 224, so that the relative balance of top/bottom heating remains unchanged. However, in alternate embodiments, depending on the cooking mode and/or food type, the power splitting ratio factors 227/229 might also be adjusted to reduce the total power consumption in a manner that would not be detrimental to the food being cooked.

When the total power consumption does not exceed the pre-determined limit, the respective broil and bake power command signals 232, 234 are generated 318. By applying the power split ratios, two power command signals are generated, one for each heating element 143, 145, based on the total power and the split ratios. The power to each heating element 143, 145 is regulated 320 based on the respective heating elements 143, 145. The process or loop between detecting 308 the actual oven temperature 225 and regulating the power 320 to each of the elements 143, 145 is repeated at a fixed rate, known as the controller loop time or controller cycle time, for the entire duration of the cooking or baking process.

The aspects of the disclosed embodiments continuously adjust the power output of the heating elements as a function of an error control output and as a fixed ratio of broil to bake element power output to reach and maintain a desired set point temperature in the oven cavity. A single controller is used to control multiple heat sources while maintaining a constant power ratio between the elements and also limiting the total (combined) current drawn by an electric oven to below a predetermined maximum value.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for an oven comprising a body defining a cooking cavity and a plurality of heating elements for heating items in the cooking cavity, the control system comprising:

a temperature sensor configured to detect an air temperature within the cooking cavity;

a user interface operative to receive a desired cooking temperature from a user; and a controller operatively coupled to the temperature sensor and the user interface, the controller comprising a memory in communication with a processor, the memory comprising program instructions for execution by the processor to:

determine a power splitting ratio between each of the plurality of heating elements;

determine a power command signal based on a calculated error value between the detected cooking cavity air temperature and the desired cooking temperature;

adjust the power splitting ratio to prevent a total power consumed by the plurality of heating elements from exceeding a pre-determined value;

calculate a power control signal for each of the plurality of heating elements based on both the power command signal and the adjusted power splitting ratio; and adjust a power level of each of the plurality of heating elements based on the respective power control signals.

2. The control system of claim 1, wherein the user interface is further operative to receive one or more user selected cooking modes, and wherein the power splitting ratio is determined as a function of the selected cooking mode and the desired cooking temperature.

3. The control system of claim 1, wherein the user interface is further operative to receive one or more user selected food types, and wherein the power splitting ratio is determined as a function of the selected cooking mode, the desired cooking temperature and the selected food type.

4. The control system of claim 1, wherein the processor is configured to multiply the power command signal by the adjusted power splitting ratio to calculate the power control signal for each of the heating elements.

5. The control system of claim 1, wherein the controller comprises a proportional integral controller, and the power command signal is determined by the proportional integral controller.

6. The control system of claim 1, wherein the controller comprises a proportional integral derivative controller, and the power command signal is determined by the proportional integral derivative controller.

7. The control system of claim 1, wherein the controller comprises a proportional controller, and the power command signal is determined by the proportional controller.

8. The control system of claim 1, wherein the controller is configured to operate each of the plurality of heating elements substantially simultaneously.

9. The control system of claim 8, wherein the controller is configured to calculate the total power that would be consumed by a combination of each of the plurality of heating elements based on the calculated power control signal for each element, determine if the total power is greater than a pre-determined power capacity level, and adjust the power control signal for each element to reduce power consumed by each of the plurality of heating elements if the total power is greater than the pre-determined power capacity level.

10. The control system of claim 1, further comprising a heating element power control module coupled to the controller, the heating element power control module configured to control an instantaneous power delivered by an energy source to each heating element as a function of the power control command signal.

11. The control system of claim 10, wherein the heating element power control module comprises an electronically-controlled gas flow regulation valve.

12. The control system of claim 10, wherein the heating element power control module comprises a TRIAC device.

13. The control system of claim 12, wherein the TRIAC device is operated in a phase-angle firing mode or a cycle-skipping mode.

14. The control system of claim 10, wherein the heating element power control module comprises a relay device.

15. The control system of claim 14, wherein the relay device is operated in a pulse width modulated mode and the relay is cycled on/off at a periodic rate to produce the desired average power delivered to its respective heating element.

16. The control system of claim 1, wherein the plurality of heating elements comprises a bake heating element and a broil heating element.

17. The control system of claim 16, wherein the plurality of heating elements further comprises a convection oven heating element.

* * * * *